(12) United States Patent
Foglia

(10) Patent No.: US 10,729,279 B2
(45) Date of Patent: Aug. 4, 2020

(54) COFFEE MACHINE WITH PRE-INFUSION SYSTEM

(71) Applicant: SIMONELLI GROUP S.P.A., Belforte del Chienti (MC) (IT)

(72) Inventor: Simone Foglia, Macerata (IT)

(73) Assignee: SIMONELLI GROUP S.P.A., Belforte del Chienti (MC) (IT)

(*) Notice: Subject to any disclaimer, the term of this patent is extended or adjusted under 35 U.S.C. 154(b) by 254 days.

(21) Appl. No.: 15/991,356

(22) Filed: May 29, 2018

(65) Prior Publication Data
US 2018/0344079 A1 Dec. 6, 2018

(30) Foreign Application Priority Data
May 30, 2017 (IT) .................... 102017000058729

(51) Int. Cl.
*A47J 31/00* (2006.01)
*A47J 31/56* (2006.01)
*A23F 5/26* (2006.01)
*A47J 31/06* (2006.01)
*A47J 31/46* (2006.01)

(52) U.S. Cl.
CPC ............... *A47J 31/56* (2013.01); *A23F 5/262* (2013.01); *A47J 31/002* (2013.01); *A47J 31/0615* (2013.01); *A47J 31/0657* (2013.01); *A47J 31/465* (2013.01)

(58) Field of Classification Search
CPC ........ A47J 31/56; A47J 31/002; A47J 31/465; A47J 31/0657; A47J 31/0615
See application file for complete search history.

(56) References Cited

U.S. PATENT DOCUMENTS 6,095,031 A * 8/2000 Warne ............... A47J 31/525 99/282
10,149,570 B2 * 12/2018 Sampaoli ............ A47J 31/002

FOREIGN PATENT DOCUMENTS

EP 2959808 A1 12/2015

OTHER PUBLICATIONS

Search Report Form IT237 °Written Opinion° dated Feb. 27, 2018 with reference to the priority Italian Patent Application No. IT 102017000058729.

* cited by examiner

*Primary Examiner* — Jason L Vaughan
*Assistant Examiner* — Amanda Kreiling
(74) *Attorney, Agent, or Firm* — Egbert, McDaniel & Swartz, PLLC

(57) ABSTRACT

A coffee machine includes a filter holder intended to contain at least one coffee dose, a dispensing unit with dispensing nozzles intended to send a flow of hot water on the coffee dose, a water system provided with a pump to supply pressurized water towards the dispensing nozzles, a heater to heat the water to be supplied to the dispensing nozzles, a dispensing valve to enable/disable the supply of hot water towards the dispensing nozzles, and a pre-infusion valve disposed upstream the dispensing valve. The pre-infusion valve is set in such a way as to operate in pulsed mode for a pre-infusion time of at least 4 seconds, with opening and closing time equal to or lower than 1 second.

10 Claims, 2 Drawing Sheets

COFFEE MACHINE WITH PRE-INFUSION SYSTEM

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present patent application for industrial invention relates to a coffee machine with pre-infusion system.

2. Description of Related Art Including Information Disclosed Under 37 CFR 1.97 and 37 CFR 1.98

As it is known, a coffee machine comprises a filter holder in which ground coffee is disposed in the form of compressed powder. The filter holder with the coffee dose is disposed under a dispensing unit of the machine. The dispensing unit is provided with dispensing nozzles connected to a water system that supplies hot water at high pressure (approximately 9-11 bars). However, it has been demonstrated that, with such a high pressure (9-11 bar) of the hot water, the water flow in the coffee dose is reduced, and not increased, because the coffee dose is excessively compressed due to the excessive migration of fines (i.e. the finest coffee particles). Therefore, the extraction of the beverage is not efficient.

EP2959808 describes such a technical problem and provides a solution, which provides for wetting the coffee dose (pre-infusion) before the pressurized hot water is supplied. In this way, the wet coffee is less compressed by the pressure of the hot water and the flow of hot water is increased, obtaining a more efficient extraction compared to the case without pre-infusion.

EP2959808 discloses a coffee machine comprising:
a source of pressurized water;
a heater connected to the source of pressurized water and to the dispensing nozzles;
a dispensing valve disposed between the heater and the dispensing nozzles; and
an additional valve disposed between the source of pressurized water and the heater.

In order to perform the pre-infusion, the additional valve is closed, the dispensing valve is closed and the water in the heater is heated, in such a way to obtain a slight pressure increase, which is sufficient for a minimum amount of water to be ejected from the heater, going towards the dispensing nozzles. In view of the above, only the dispensing valve is opened and a small amount of water with low pressure is ejected from the heater, and reaches the coffee dose through the dispensing nozzles, getting it wet. Throughout the pre-infusion process, the additional valve is kept closed. When the pre-infusion process is completed, the additional valve is opened and the pressurized water reaches the coffee dose, extracting the beverage.

Such a pre-infusion system of the prior art is impaired by some drawbacks because of the time needed to completely heat the water in the heater. Moreover, by getting the coffee dose completely and continuously wet during the pre-infusion step, the pre-infusion is not perfect and efficiency problems are encountered during the extraction of the beverage.

The purpose of the present invention is to eliminate the drawbacks of the prior art by disclosing a coffee machine with pre-infusion system, which is rapid, efficient, reliable, inexpensive and easy to make.

These purposes are achieved according to the invention with the characteristics of the independent claim 1.

Advantageous embodiments of the invention will appear from the dependent claims.

BRIEF SUMMARY OF THE INVENTION

After performing several experimental tests, the applicant has surprisingly discovered that a perfect pre-infusion of the coffee dose can be obtained in the filter holder by supplying the coffee dose with an (alternate) intermittent flow of pressurized hot water that provides for hot water pulses with length equal to or lower than 1 second. In fact, a relaxation and settlement of the coffee dose is obtained in the time interval between a water impulse and the following one. Such a relaxation of the coffee dose creates a counter-pressure that contributes to increase the water flow through the coffee during the extraction of the beverage, with higher efficiency.

Such a result is obtained by installing a pre-infusion valve in the water system, which supplies the dispensing nozzles of the dispensing unit. Such a pre-infusion valve is a pulsing electrovalve provided with a shutter intended to open and close the communication in the water system with opening and closing time that is equal to or lower than 1 second.

Said pre-infusion valve is configured in such a way to operate in pulsed mode for a time interval of at least 4 seconds to guarantee a pre-infusion of the coffee dose.

BRIEF DESCRIPTION OF THE SEVERAL VIEWS OF THE DRAWINGS

Additional features of the invention will appear clearer from the detailed description below, which refers to merely illustrative, not limiting embodiments, wherein.

DETAILED DESCRIPTION OF THE INVENTION

Figure 1:
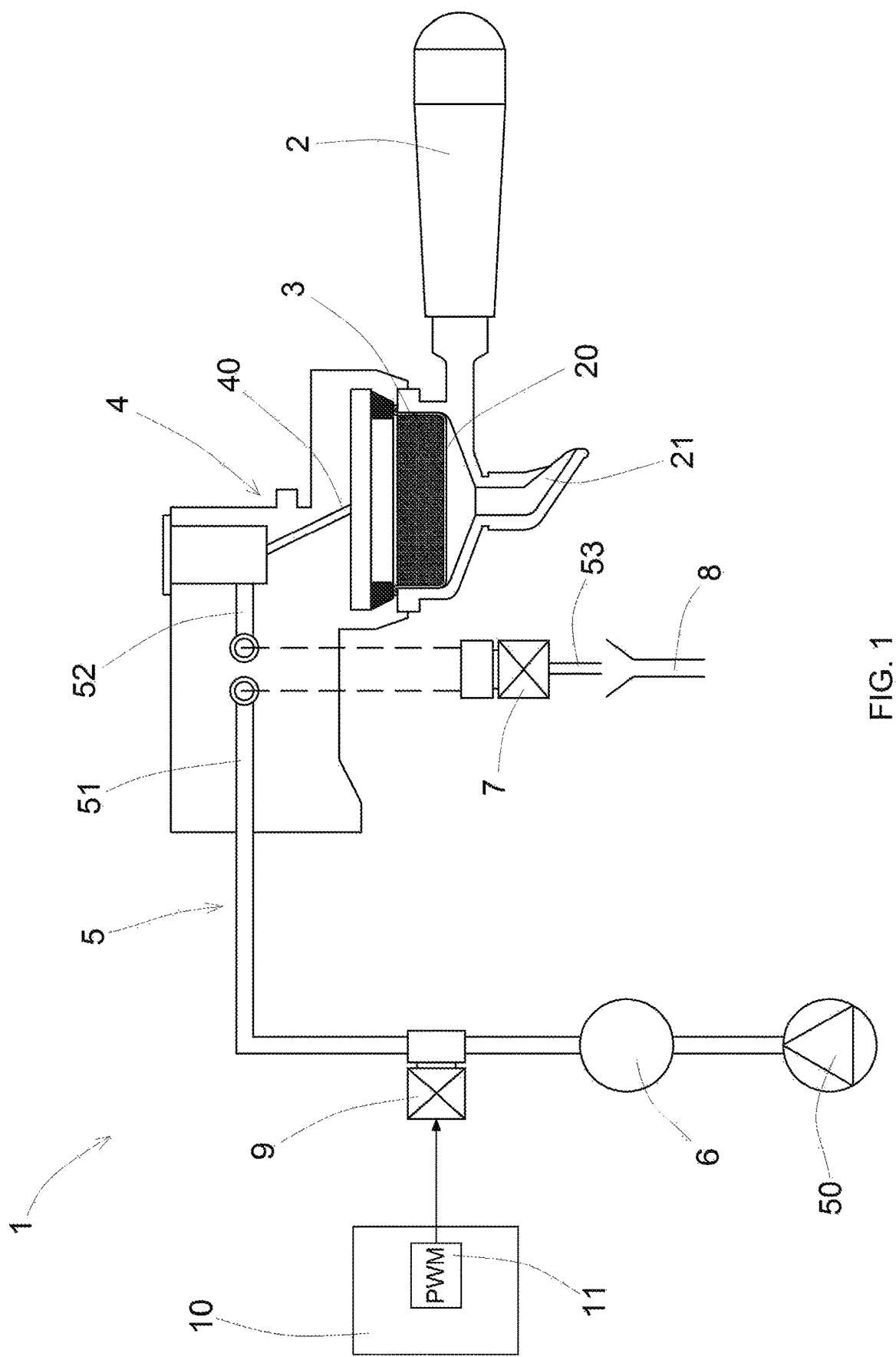
FIG. 1 is a block diagram that diagrammatically shows a first embodiment of a coffee machine according to the invention.

With reference to the Figures, a coffee machine according to the invention is described, which is generally indicated with reference numeral (1).

Figure 2:
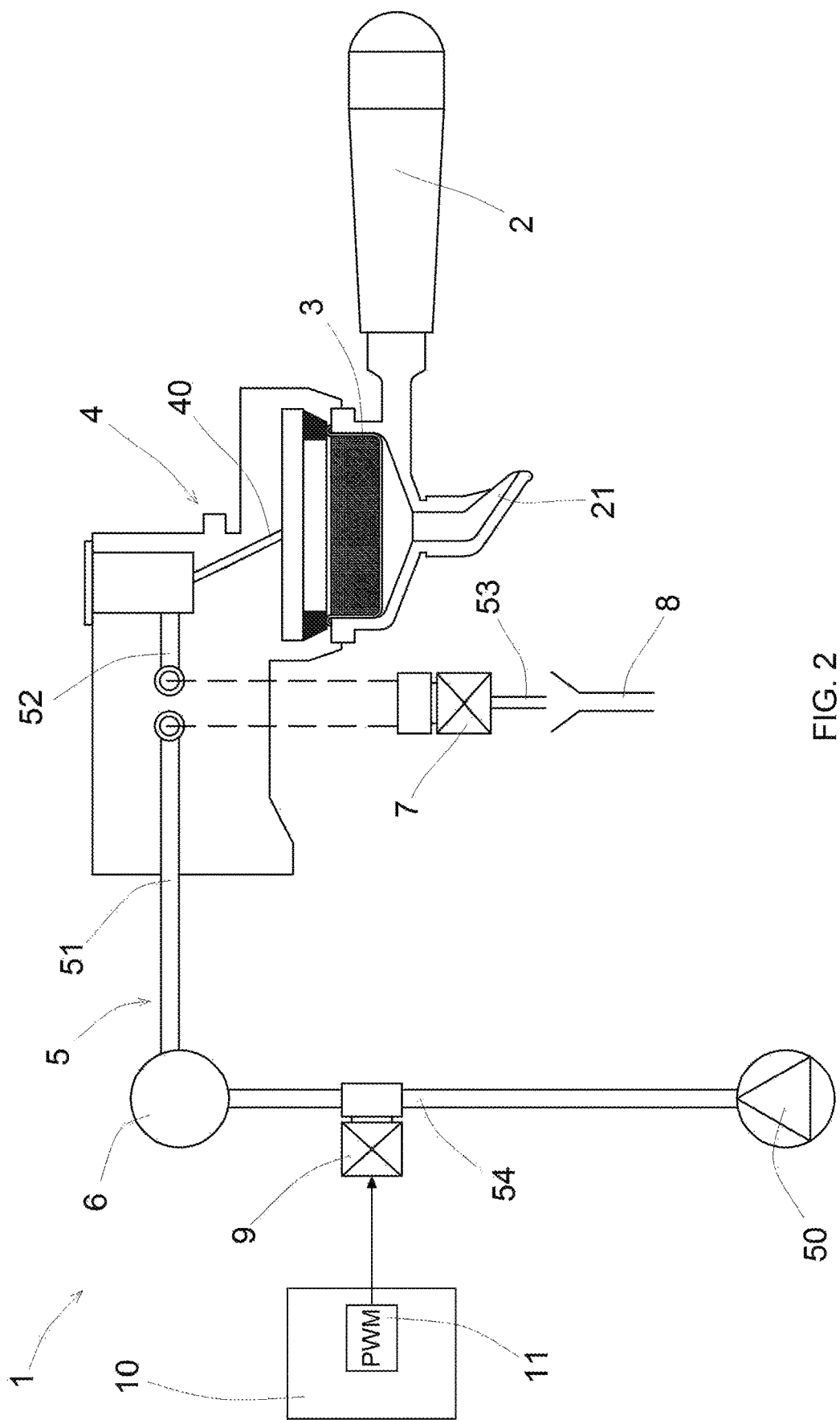
FIG. 2 is a block diagram that diagrammatically shows a second embodiment of a coffee machine according to the invention.

With reference to FIGS. 1 and 2, the coffee machine (1) comprises a filter holder (2) with a housing (20) suitable for receiving one or more coffee doses (3). The coffee is in the form of ground coffee or powder coffee and is compressed in the housing (20) of the filter holder. The filter holder (2) has an extraction nozzle (21) in communication with the housing (20) from where the beverage is extracted.

The filter holder (2) is disposed in a dispensing unit (4) with dispensing nozzles (40) to supply the coffee dose (3) with hot water.

The dispensing nozzles (40) of the dispensing unit are connected to a water system (5). The water system (5) comprises a pump (50) intended to supply pressurized water at a pressure of approximately 9-11 bar, which generally comes from a tank (not shown in the figures).

A heater (6) is disposed in the water system (5) between the pump (50) and the dispensing nozzle (40) of the dispensing unit. The heater (6) is suitable for heating the water to a temperature of approximately 88-96° C., i.e. a temperature that is suitable for extracting the beverage.

Therefore, in the water system (5), the water upstream the heater (6) is cold; instead, the water downstream the heater (6) is hot, with a temperature of approximately 88-96° C.

A dispensing valve (7) is disposed in the dispensing unit (4) to enable or disable the supply of water from the water system (5) towards the dispensing nozzles (40) of the dispensing unit.

The dispensing valve (7) is a three-way electrovalve and is connected to three ducts:
an inlet duct (51) in communication with the water system (5),
an outlet duct (52) in communication with the dispensing nozzles (40), and
a draining duct (53) in communication with a drain (8).

During the extraction of the beverage, the dispensing valve (7) opens the communication between the inlet duct (51) and the outlet duct (52) and closes the communication with the draining duct (53). When the dispensing operation is completed, the dispensing valve (7) opens the communication between the outlet duct (52) and the draining duct (53) and closes the communication with the inlet duct (51). In view of the above, at the end of the extraction, the water that remains between the coffee dose (3) and the dispensing unit (4) is drained, in such a way as to eliminate the pressure in this area of the dispensing unit and permit the removal of the filter holder (2) without any leaks of pressurized water from the water system (5).

According to the invention, a pre-infusion valve (9) is disposed in the water system (5) upstream the dispensing valve (7).

According to the first embodiment of FIG. 1, the pre-infusion valve (9) is disposed downstream the heater (6), i.e. in the duct (51) that contains hot water at a temperature of 88-96° C.

According to the second embodiment of FIG. 2, the pre-infusion valve (9) is disposed upstream the heater (6), i.e. in a duct (54) that contains cold water.

The pre-infusion valve (9) is a two-way pulsing valve; said pre-infusion valve (9) has a shutter intended to open and close the communication between the two ways of the valve, with ON/OFF system, in pulsed mode with opening and closing time equal to or lower than 1 second.

The pre-infusion valve (9) is connected to a control unit (10) of the machine provided with switch means (11) to control the pre-infusion valve (9) with a pulse train having a duration equal to or lower than 1 second, and a period equal to or lower than 2 seconds. For illustrative purposes, the switch means (11) can be a relay or a PWM (pulse width modulation) power supply.

The pre-infusion valve (9) must operate in pulsed mode at least for a pre-infusion time of at least 4 seconds, preferably 5 seconds, to supply the coffee dose (3) with an (alternate) intermittent flow of pressurized hot water. In view of the above, if a pre-infusion time of 4 seconds is set, the coffee dose (3) receives a first hot water impulse of 1 second, which gets the coffee wet; then, water is not supplied for 1 second and the coffee can relax and settle down; afterwards, a second hot water impulse of 1 second is received, which gets the coffee additionally wet; then water is not supplied for 1 second and the coffee can relax and settle down again, thus avoiding an excessive compression that may obstruct a highly pressurized flow.

It must be noted that during the pre-infusion, the water pulses are received at high pressure (9-11 bar); however, the duration of said water pulses is not sufficient to compress the coffee powder and the time without water pulse is sufficient to determine a relaxation of the coffee powder.

When the pre-infusion time has elapsed, the pre-infusion valve (9) can be kept open, in such a way that a continuous flow reaches the coffee dose (3), which has been pre-infused, for extracting the beverage.

Alternatively, the pre-infusion valve (9) can operated in pulsed mode also during the extraction of the beverage; in fact, it has been found out that by operating the pre-infusion valve (9) in pulsed mode with pulses of 1 second, a perfect extraction of the beverage is obtained after approximately 5 seconds without any obstruction.

It must be noted that the dispensing valve (7) is kept open throughout the pre-infusion of the coffee and the extraction of the beverage. Instead, the pre-infusion electrovalve (9) operates in pulsed mode at least for the pre-infusion period, which must be of at least 4 seconds. When the pre-infusion period is completed, the pre-infusion electrovalve (9) can be kept open to permit an extraction with continuous flow, or can continue to operate in pulsed mode to obtain an extraction with intermittent flow.

The pulse time and the ON-OFF pulse frequency of the pre-infusion valve (9) can be set with the control panel (10) in such a way to set the pulsing time, the ON time and the OFF time of the pre-infusion valve (9).

It must be considered that the function of the pre-infusion valve (9) cannot be performed by the dispensing valve (7) because the dispensing valve (7) cannot operate in pulsed mode. In fact, the dispensing valve (7) is a three-way valve, with a third way connected to the draining duct (53) that goes to the drain (8). Therefore, by opening and closing the dispensing valve (7) during the pre-infusion or the dispensing step, the water in contact with the coffee dose (3) would be conveyed towards the drain (8) during the first moments of extraction. This would eliminate the substances and the aromas from the coffee dose (3), which have been partially dissolved and extracted by the water, without permitting the extraction of said substances and aromas from the extraction nozzle (21) of the filter holder when passing through the coffee dose.

The provision of the two-way pre-infusion valve (9) permits to keep the water system (5) and the area of the dispensing unit (4) with the coffee dose (3) always full, increasing and decreasing the pressure of the water on the coffee dose, without losing water towards the drain (8) during the extraction of the beverage.

Numerous equivalent variations and modifications can be made to the present embodiments of the invention, which are within the reach of an expert of the field, falling in any case within the scope of the invention.

I claim:

1. Coffee machine comprising:
   a filter holder intended to contain at least one coffee dose;
   a dispensing unit intended to receive the filter holder; said dispensing unit being provided with dispensing nozzles intended to send a flow of hot water on the coffee dose contained in the filter holder;
   a water system provided with a pump to supply pressurized water to said dispensing nozzles of the dispensing unit;
   a heater disposed in said water system to heat the water to be supplied to the dispensing nozzles;
   a dispensing valve disposed in said water system between the heater and the dispensing nozzles to enable/disable the supply of hot water to said dispensing nozzles; and
   a pre-infusion valve disposed in said water system upstream said dispensing valve;
   characterized in that
   said pre-infusion valve is a two-way pulsing valve comprising a shutter intended to open and close the communication between the two ways of the valve in pulsed mode with ON/OFF system; said pre-infusion valve being set in such a way to operate in pulsed mode for a pre-infusion time of at least 4 seconds, with opening and closing time equal to or lower than 1 second.

2. The coffee machine of claim 1, wherein the pre-infusion valve is connected to a control unit of the machine provided with switch means to control the pre-infusion valve with a pulse train having a duration equal to or lower than 1 second, and a period equal to or lower than 2 seconds.

3. The coffee machine of claim 2, wherein said switch means comprise a relay.

4. The coffee machine of claim 2, wherein said switch means comprise a PWM (Pulse Width Modulated) power supply.

5. The coffee machine of claim 1, wherein the pre-infusion valve is disposed downstream said heater.

6. The coffee machine of claim 1, wherein the pre-infusion valve is disposed upstream said heater.

7. The coffee machine of claim 1, wherein the dispensing valve is a three-way electrovalve and is connected to three ducts:
   an inlet duct in communication with the water system;
   an outlet duct in communication with the dispensing nozzles; and
   a draining duct in communication with a drain.

8. The coffee machine of claim 7, wherein the dispensing valve is set in such a way to:
   open the communication between the inlet duct and the outlet duct and close the communication to the draining duct during the pre-infusion of the coffee dose and the extraction of the beverage; and
   open the communication between the outlet duct and the draining duct and close the communication to the inlet duct when the extraction of the beverage is completed.

9. Coffee extraction method with a coffee machine comprising the following steps:
   pre-infusion of a coffee dose contained in a filter holder by supplying an intermittent flow of pressurized hot water on the coffee dose for a pre-infusion time of at least 4 seconds, wherein the intermittent flow has a duration that is equal to or lower than 1 second, and a period that is equal to or lower than 2 seconds, and
   extraction of the beverage by supplying a continuous or intermittent flow of pressurized hot water.

10. The coffee extraction method of claim 9, wherein said beverage is extracted by supplying an intermittent flow of pressurized hot water, wherein the intermittent flow has a duration that is equal to or lower than 1 second, and a period that is equal to or lower than 2 seconds.

* * * * *